(12) United States Patent
Vaidya et al.

(10) Patent No.: US 7,930,489 B2
(45) Date of Patent: Apr. 19, 2011

(54) TECHNIQUES FOR OPTIMIZING CONFIGURATION PARTITIONING

(75) Inventors: Sachin Vaidya, Sunnyvale, CA (US); Tushar Bandopadhyay, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 468 days.

(21) Appl. No.: 12/058,180

(22) Filed: Mar. 28, 2008

(65) Prior Publication Data

US 2009/0249020 A1 Oct. 1, 2009

(51) Int. Cl.
*G06F 12/02* (2006.01)
(52) U.S. Cl. ................. 711/153; 711/E12.006
(58) Field of Classification Search ............ None
See application file for complete search history.

(56) References Cited

U.S. PATENT DOCUMENTS

| | | | |
|---|---|---|---|
| 2004/0153708 A1* | 8/2004 | Joshi et al. | 714/4 |
| 2005/0108717 A1* | 5/2005 | Hong et al. | 718/102 |
| 2007/0274314 A1* | 11/2007 | Werber et al. | 370/392 |
| 2009/0119773 A1* | 5/2009 | D'Amore et al. | 726/21 |
| 2009/0133031 A1* | 5/2009 | Inoue | 718/105 |

* cited by examiner

*Primary Examiner* — Matt Kim
*Assistant Examiner* — Ryan Dare
(74) *Attorney, Agent, or Firm* — Hunton & Williams LLP (57) ABSTRACT

Techniques for optimizing configuration partitioning are disclosed. In one particular exemplary embodiment, the techniques may be realized as a system for configuration partitioning comprising a module for providing one or more policy managers, a module for providing one or more applications, the one or more applications assigned to one or more application groups, a module for associating related application groups with one or more blocks, and a module for assigning each of the one or more blocks to one of the one or more policy managers, wherein if one or more of the one or more blocks cannot be assigned to a policy manager, breaking the one or more blocks into the one or more application groups and assigning the one or more application groups to one of the one or more policy managers.

19 Claims, 6 Drawing Sheets

Two Policy Managers - PM1 and PM2

| Block Name | Number of Servers Used With Application Service Groups | Application Service Group Names | Associated Number of Servers | Priority | Block Priority |
|---|---|---|---|---|---|
| A | 5 | | | | 5 |
| | | A1 | 1 | 6 | |
| | | A2 | 1 | 5 | |
| | | A3 | 1 | 6 | |
| | | A4 | 1 | 5 | |
| | | A5 | 1 | 6 | |
| B | 2 | | | | 1 |
| | | B1 | 1 | 5 | |
| | | B2 | 1 | 1 | |
| C | 2 | | | | 1 |
| | | C1 | 1 | 2 | |
| | | C2 | 1 | 1 | |
| D | 1 | | | | 2 |
| | | D1 | 1 | 2 | |
| E | 3 | | | | 4 |
| | | E1 | 1 | 5 | |
| | | E2 | 1 | 4 | |
| | | E3 | 1 | 4 | |
| F | 4 | | | | 3 |
| | | F1 | 1 | 5 | |
| | | F2 | 1 | 4 | |
| | | F3 | 1 | 3 | |
| | | F4 | 1 | 4 | |
| G | 3 | | | | 3 |
| | | G1 | 1 | 3 | |
| | | G2 | 1 | 4 | |
| | | G3 | 1 | 4 | |

Chunk Size = 10

FIG. 4

Sorted by Priority

| Block Name | Priority |
|:----------:|:--------:|
| B | 1 |
| C | 1 |
| D | 2 |
| F | 3 |
| G | 3 |
| E | 4 |
| A | 5 |

FIG. 5

|  | PM1 Capacity | PM2 Capacity |
|---|---|---|
| All Blocks Unassigned | 10 | 10 |
| PM1 assigned Block B servers | 8 | 10 |
| PM1 assigned Block C servers | 6 | 10 |
| PM1 assigned Block D servers | 5 | 10 |
| PM1 assigned Block F servers | 1 | 10 |
| PM2 assigned Block G servers | 1 | 7 |
| PM2 assigned Block E servers | 1 | 4 |
| Block A not assigned completely | | |
| PM1 assigned A2 servers | 0 | 4 |
| PM2 assigned A4 servers | 0 | 3 |
| PM2 assigned A1 servers | 0 | 2 |
| PM2 assigned A3 servers | 0 | 1 |
| PM2 assigned A5 servers | 0 | 0 |

FIG. 6

TECHNIQUES FOR OPTIMIZING CONFIGURATION PARTITIONING

FIELD OF THE DISCLOSURE

The present disclosure relates generally to configuration partitioning and, more particularly, to techniques for optimizing configuration partitioning.

BACKGROUND OF THE DISCLOSURE

In a server and application management framework in a data center, a problem of scalability exists. Increasing the number of physical servers or increasing the number of supported applications increases the requirement of effective management of those servers and/or applications.

Also, many existing management configurations may be incapable of operating, or incapable of operating at increasing efficiency, as the scale of a data center is increased. Configuration partitioning, where applications are distributed among physical servers, is difficult to optimize and balance. Those difficulties increase significantly with additional applications and/or servers.

In view of the foregoing, it may be understood that there are significant problems and shortcomings associated with current configuration partitioning technologies.

SUMMARY OF THE DISCLOSURE

Techniques for optimizing configuration partitioning are disclosed. In one particular exemplary embodiment, the techniques may be realized as a system for configuration partitioning comprising a module for providing one or more policy managers, a module for providing one or more applications, the one or more applications assigned to one or more application groups, a module for associating related application groups with one or more blocks, and a module for assigning each of the one or more blocks to one of the one or more policy managers, wherein if one or more of the one or more blocks cannot be assigned to a policy manager, breaking the one or more blocks into the one or more application groups and assigning the one or more application groups to one of the one or more policy managers.

In accordance with other aspects of this particular exemplary embodiment, the one or more application groups are associated with a priority.

In accordance with further aspects of this particular exemplary embodiment, the one or more blocks are associated with a priority.

In accordance with additional aspects of this particular exemplary embodiment, the priority of the one or more blocks is determined by the highest priority of the associated one or more application groups.

In accordance with additional aspects of this particular exemplary embodiment, the blocks may be sorted based on priority.

In another particular exemplary embodiment, the technique(s) may be realized as a method for configuration partitioning comprising the steps of providing one or more policy managers, providing one or more applications, the one or more applications assigned to one or more application groups, associating related application groups with one or more blocks, and assigning each of the one or more blocks to one of the one or more policy managers, wherein if one or more of the one or more blocks cannot be assigned to a policy manager, breaking the one or more blocks into the one or more application groups and assigning the one or more application groups to one of the one or more policy managers.

In accordance with further aspects of this particular exemplary embodiment, the one or more application groups are associated with a priority.

In accordance with additional aspects of this particular exemplary embodiment, the one or more blocks are associated with a priority.

In accordance with further aspects of this particular exemplary embodiment, the priority of the one or more blocks is determined by the highest priority of the associated one or more application groups.

In accordance with additional aspects of this particular exemplary embodiment, the blocks are sorted based on priority.

In accordance with additional aspects of this particular exemplary embodiment, at least one processor readable medium for storing a computer program of instructions configured to be readable by at least one processor for instructing the at least one processor to execute a computer process for performing the method is provided.

In another particular exemplary embodiment, the technique(s) may be realized as an article of manufacture for configuration partitioning, the article of manufacture comprising at least one processor readable carrier, and instructions carried on the at least one carrier, wherein the instructions are configured to be readable from the at least one carrier by at least one processor and thereby cause the at least one processor to operate so as to provide one or more policy managers, provide one or more applications, the one or more applications assigned to one or more application groups, associate related application groups with one or more blocks, and assign each of the one or more blocks to one of the one or more policy managers, wherein if one or more of the one or more blocks cannot be assigned to a policy manager, breaking the one or more blocks into the one or more application groups and assigning the one or more application groups to one of the one or more policy managers.

In accordance with further aspects of this particular exemplary embodiment, the one or more application groups are associated with a priority.

In accordance with additional aspects of this particular exemplary embodiment, the one or more blocks are associated with a priority.

In accordance with further aspects of this particular exemplary embodiment, the priority of the one or more blocks is determined by the highest priority of the associated one or more application groups.

In accordance with additional aspects of this particular exemplary embodiment, the blocks are sorted based on priority.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
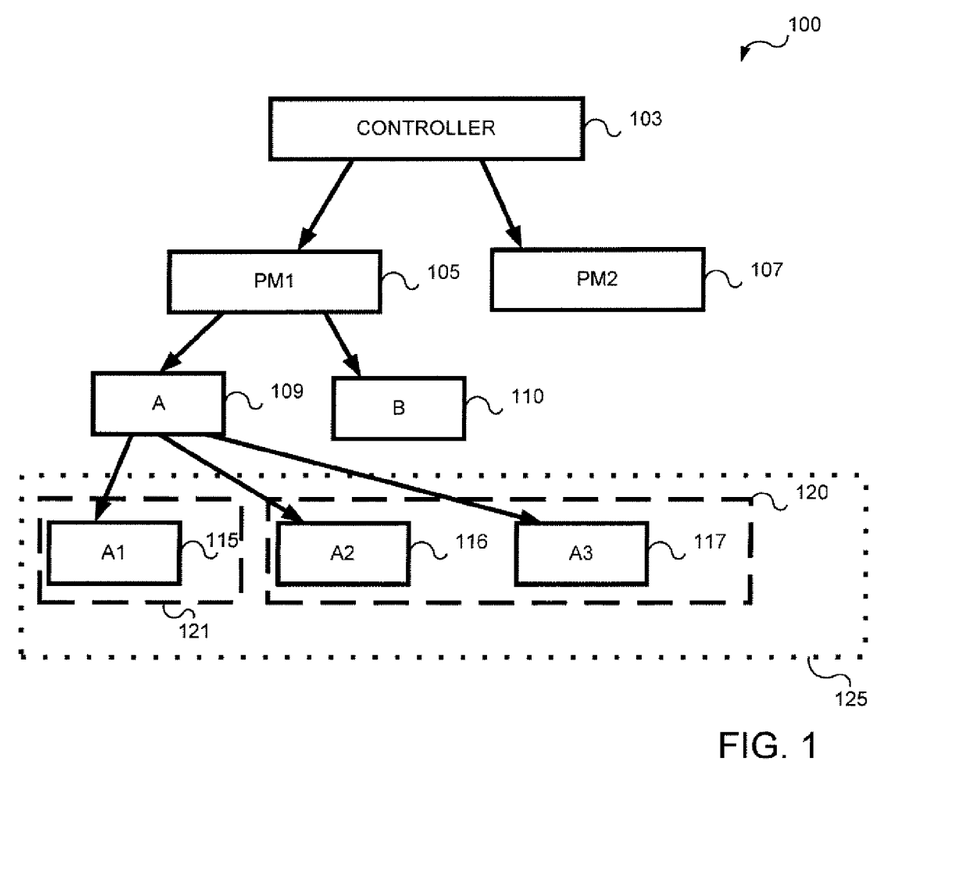
FIG. 1 shows a diagram overview of a controller and system in accordance with an embodiment of the present disclosure.

Referring to FIG. 1, there is shown a system 100 of policy managers and application service groups ("ASGs") in accordance with an embodiment of the present disclosure. The system 100 may comprise a controller 103 in communication with policy manager PM1 105 and policy manager PM2 107. The controller 103 may be a physical machine, for example, a computer, or may be a cluster of physical machines. The controller 103 may contain, for example, one or more processors for carrying out instructions, and may include memory to store and recall information. The controller 103 may also include input devices for creating input, and output devices for transmitting data. The controller 103 may operate to execute code. The connections between, for example, the controller 103 and policy manager PM1 105 and policy manager PM2 107 may be via one or more networks, or may be via dedicated communication links. The controller 103 may operate to create and/or remove connections between policy managers PM1 105 and PM2 107 and one or more services. The controller 103 may also be in communication one or more other networks, not shown.

Each network may include, but is not limited to, for example, a wide area network ("WAN"), a local area network ("LAN"), a global network such as the Internet, a telephone network such as a public switch telephone network, a wireless communication network, a cellular network, an intranet, or the like, or any combination thereof. Also, each network may be used so that components of the present disclosure may be in communication with one another. In exemplary embodiments of the present disclosure, each network may include one or any number of the exemplary types of networks mentioned above operating as a stand-alone network or in cooperation with each other. Use of the term network herein is not intended to limit the one or more networks to a single network.

Each of the policy managers, shown in FIG. 1 as PM1 105 and PM2 107, may be a physical machine, for example, a computer, or may be a cluster of physical machines. The policy managers may contain, for example, one or more processors for carrying out instructions, and may include memory to store and recall information. The policy managers may also include input devices for creating input, and output devices for transmitting data. The policy managers may operate to execute code. The policy managers may be operable to alter the availability of one or more applications running on one or more systems, and may otherwise manage the one or more applications. The policy managers may be in communication with other policy managers, one or more controllers 103, and/or one or more servers or applications via a network or dedicated link. The policy managers may also be in communication one or more other networks.

The system 100 may also comprise entities below the policy managers PM1 105 and PM2 107. Each of the servers A 109 and B 110 may contain, for example, one or more processors for carrying out instructions, and may include memory to store and recall information. The servers A 109 and B 110 may also include input devices for creating input, and output devices for transmitting data. The servers A 109 and B 110 may operate to execute code. The servers A 109 and B 110 may be operable to run one or more applications. Shown in FIG. 1, server A 109 may be operating three applications, shown as A1 115, A2 116, and A3 117. For example, a server may be operable to run a database, or may be operable to run a web server application. The servers A 109 and B 110 may be in communication with other systems, one or more controllers 103, and/or one or more policy managers via a network or dedicated link. The servers A 109 and B 110 may also be in communication one or more other networks.

Shown in FIG. 1, one or more applications may comprise an application service group. For example, applications A2 116 and A3 117 may comprise an application service group 120. Application A1 115 may comprise an application service group 121 by itself. An application service group may be defined as an encapsulation for an application hierarchy. For example, a database and a database search application may be encapsulated into one application service group. Other applications may be encapsulated into other service groups as well. Application service groups may be assigned a priority. For example, a first application service group may be assigned a priority of 1, and a second application service group may be assigned a priority of 5, meaning that the first application service group should have precedence over the second application service group. Priority numbers may be assigned to application service groups to determine which application service group or groups should have precedence for processor availability, memory availability, or other types of resource scheduling. Priority numbers may also be assigned according to the business value of the particular application service group.

Also shown in FIG. 1, one or more application service groups may be encapsulated into one or more blocks. For example, a block A 125 may comprise application service group 120 and application service group 121. A block is a grouping of one or more application service groups, where the application service groups may be explicitly or implicitly associated with one another. A block may be associated with a priority. The priority associated with a block may be the highest priority of an associated application service group. For example, a block having an application service group with a priority of 5 and an application service group having a priority of 1 may have a block priority of 1 if priority 1 is higher than priority 5. An implicit dependency between application service groups may arise if more than one application service group runs on the same system or group of systems. An explicit dependency between application service groups may arise if one application service group is dependent on another application service group. For example, a web server application may require the use of a database application, so that the application service group associated with the web server application is explicitly dependent on the application service group associated with the database application.

Figure 2:
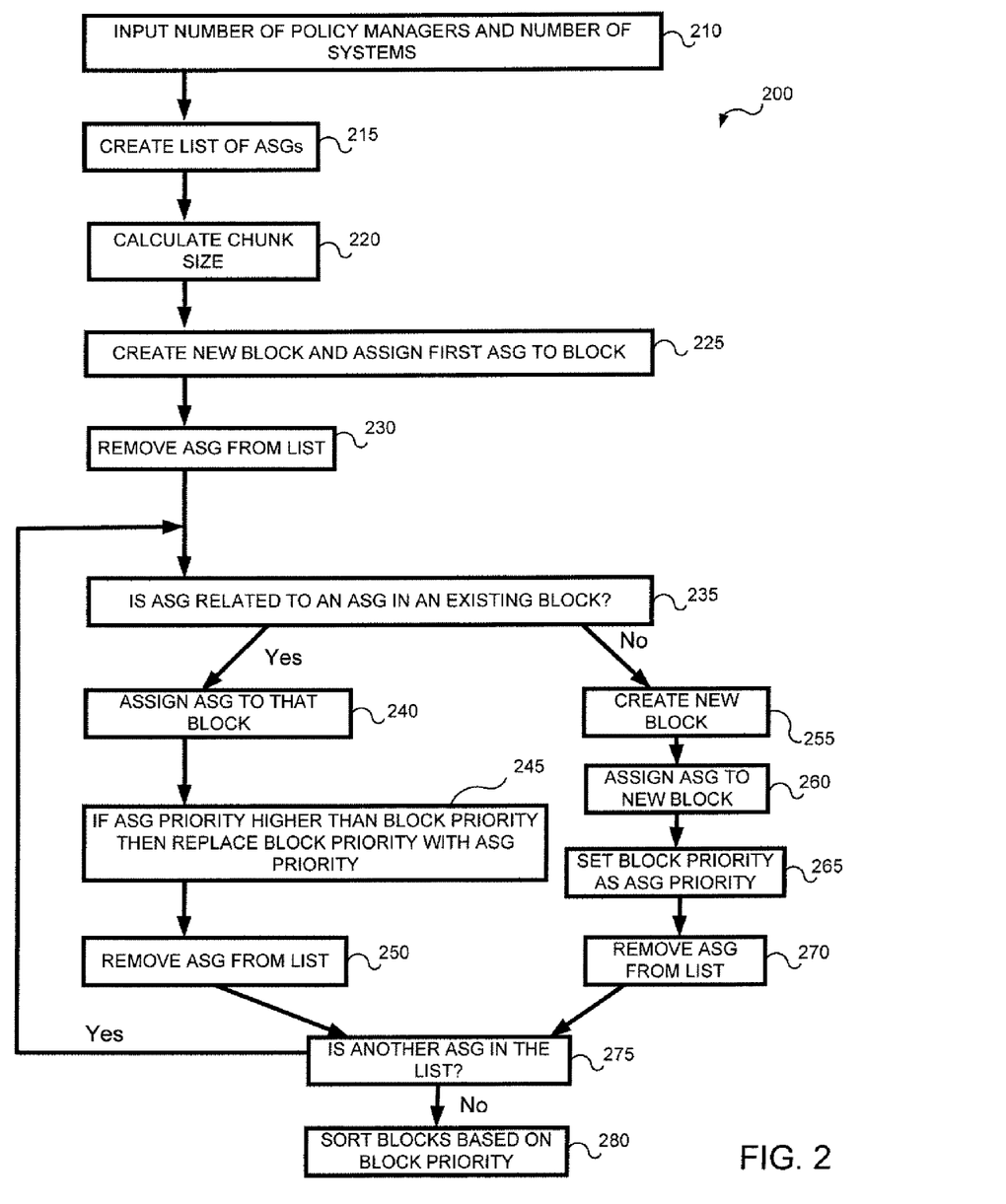
FIG. 2 shows a flow chart depicting the assignment of application service groups into one or more blocks in accordance with an embodiment of the present disclosure.
Figure 3:
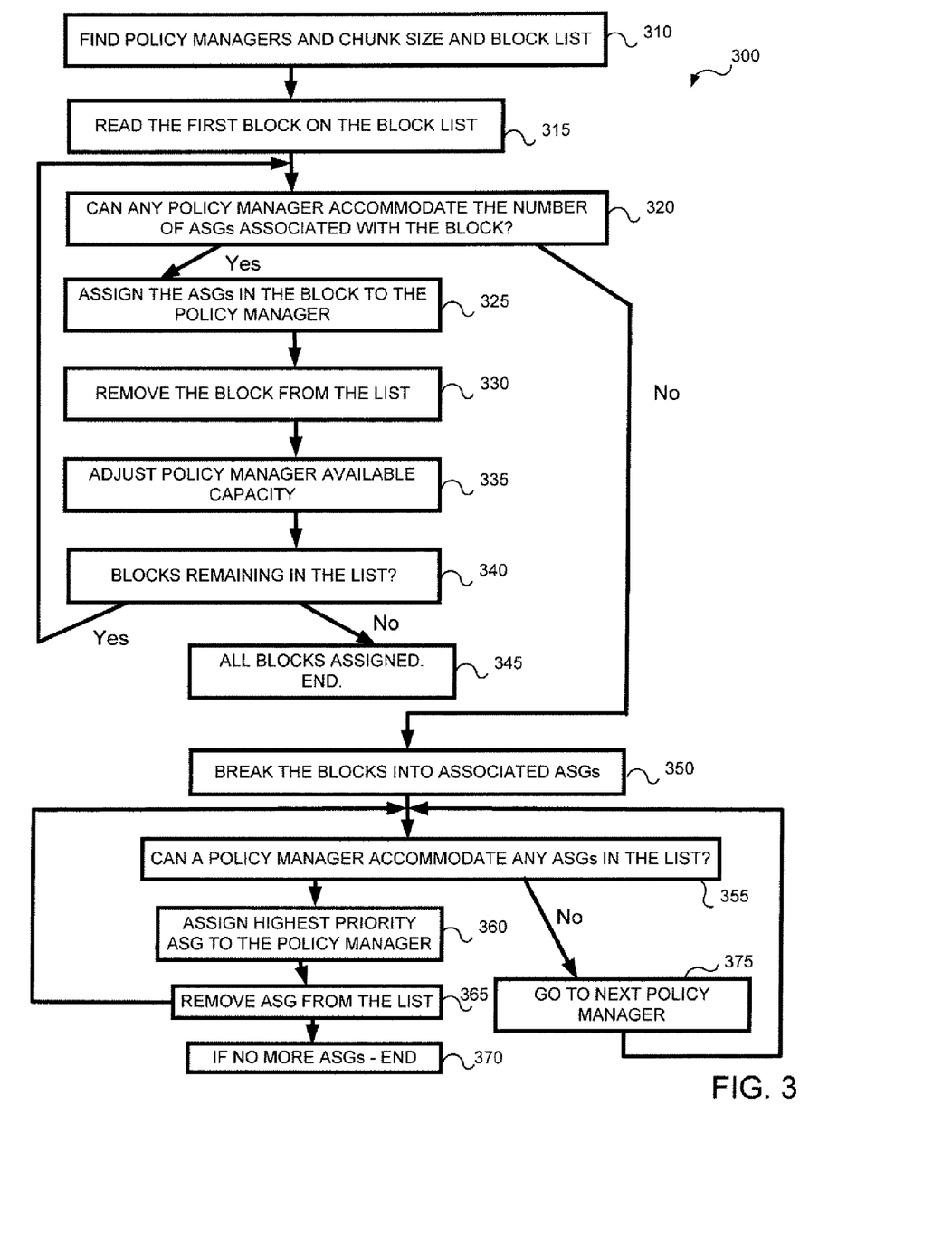
FIG. 3 shows a flow chart depicting the assignment of application service groups into one or more policy managers in accordance with an embodiment of the present disclosure.

Turning now to FIGS. 2 and 3, a method for calculating configuration partitions is shown in accordance with an embodiment of the present disclosure. FIG. 2 shows a method 200 for calculating and assigning blocks. In step 210, a controller may find available policy managers in an environment. The controller may find the available policy managers by dynamically locating them within the environment, or the policy managers may be provided to the controller in, for example, a list. The controller may order the policy managers according to any criteria. For example, the controller may order the available policy managers by available capacity or by network latency, or the policy managers may be unordered.

In step 215, the controller or another system may be operable to find a total number of application service groups to be assigned within the environment. The controller may find the available application service groups by dynamically locating them within the environment, or the application service groups may be provided to the controller in, for example, a list. The controller may order the application service groups according to any criteria. For example, the controller may order the application service groups by priority or by dependence, or the application service groups may be unordered.

In step 220, the controller or other system may be operable to calculate a chunk size from information found in steps 210 and 215. The chunk size may be calculated by dividing the total number of servers on which application service groups are configured by the total number of available policy managers. In other embodiments, the chunk size may be different for two or more policy managers, taking into account, for example, differences in capacity or processing power between the two or more policy managers.

In step 225, the controller may create a new block, and may assign one of the application service groups to the new block. The controller may assign a block priority of the newly created block a value equal to a priority of the application service group assigned to the block.

In step 230, the controller may remove the application service group from a list of application service groups.

In step 235, for each application service group remaining in the list, the controller may attempt to determine if the application service group is related to an application service group in an existing block. The controller may attempt to determine if, for example, the application service group in the list is explicitly or implicitly dependent upon any application service group in a block, or vice versa.

In step 240, if the controller determines that the application service group in the list is related to an application service group in a block, the controller may assign the application service group in the list to the block with the related application service group.

In step 245, the controller may then determine the priority of the newly assigned application service group. If the priority of the application service group is higher than the block priority, the controller may assign the priority of the application service group to the block priority. If the priority of the application service group is equal to or lower than the block priority, the controller may not assign the application service group priority to the block priority.

In step 250, the controller may then remove the application service group from the list.

In step 255, if the application service group in the list is not related to an application service group in an existing block, the controller may create a new block.

In step 260, the controller may assign the application service group to the new block.

In step 265, the controller may then set the block priority to the priority of the newly added application service group.

In step 270, the controller may remove the application service group from the list.

In step 275, when the application service group in the list is either added to an existing block or placed in a new block, the controller may determine if any application service groups remain in the list. If application service groups remain in the list, the controller may begin the assigning process again, starting again in step 235.

In step 280, if no more application service groups remain in the list, the blocks may be sorted by block priority. The blocks may be sorted so that priority descends from highest priority blocks to lowest priority blocks, or vice versa. In another embodiment, the blocks are sorted according to another criteria, such as the overall number of high priority application service groups within each block.

Turning now to FIG. 3, a method 300 for populating the policy managers is shown. In step 310, the controller may identify the policy managers and the chunk size calculated earlier in method 200. The chunk size may be used as an indicator of the available capacity of the policy manager. The controller may also identify and parse the previously ordered block list.

In step 315, the controller may identify the first block associated with a policy manager.

In step 320, the controller may identify the number of application service groups in the identified block, and may attempt to associate the servers associated with the application service groups in the block to a policy manager. If the first policy manager that the controller identifies does not have an available capacity equal to or greater than the number of servers that may be required by the application service groups in the block, the controller may attempt to identify another policy manager with available capacity equal to or greater than the number of servers that may be required by the application service groups in the block.

In step 325, if the identified policy manager has an available capacity equal to or greater than the number of application service groups in the block, the controller may assign each of the servers associated with the application service groups in the block to the policy manager.

In step 330, the controller may then remove the block from the list.

In step 335, the controller may then adjust the available capacity of the policy manager by subtracting the number of servers that may be required by the application service groups added from the existing available capacity of the policy manager.

In step 340, after the block has been removed from the list, if one or more blocks remain on the list, the controller may repeat the process, starting again at step 320. If no other blocks remain on the list, the method may end at step 345.

In step 320, if the controller attempts to associate a block with a policy manager, but no policy manager identified by the controller has the available capacity to be assigned all of the application service groups identified with the block, then no more blocks may be assigned to policy managers in entirety.

In step 350, the controller may break the blocks into the component application service groups. The controller may break only the first block on the list, or may break all of the blocks remaining on the list, and may add the application service groups to the list. The controller may attempt to order the application service groups based on, for example, priority, so that application service groups with higher priority are assigned to policy managers ahead of application service groups with lower priority.

In step 355, the controller may attempt to assign an application service group to a policy manager.

In step 375, if that policy manager has an available capacity of zero, then the controller may attempt to assign the application service group to another policy manager.

Alternatively, in step 360, the controller may assign an application service group to a policy manager, and then may reduce the policy manager's available capacity by the number of servers that may be required by the application service group.

In step 365, the controller may remove the application service group from the list.

In step 370, if no more application service groups remain in the list, and no more blocks remain in the list, the method 300 may end. If other application service groups remain on the list, the controller may attempt to assign the application service groups until the list is empty, starting again at step 355.

Figure 4:
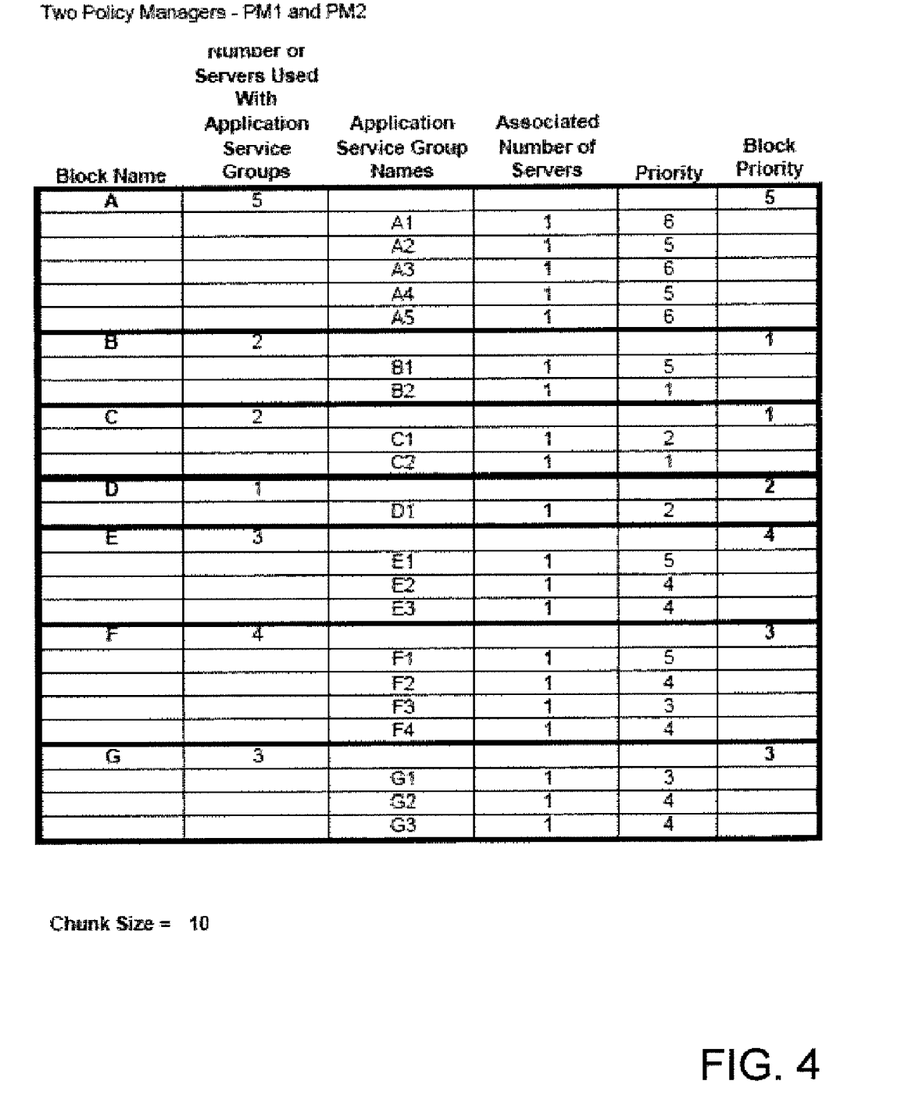
FIG. 4 shows an example of application service groups and blocks in accordance with an embodiment of the present disclosure.
Figure 5:
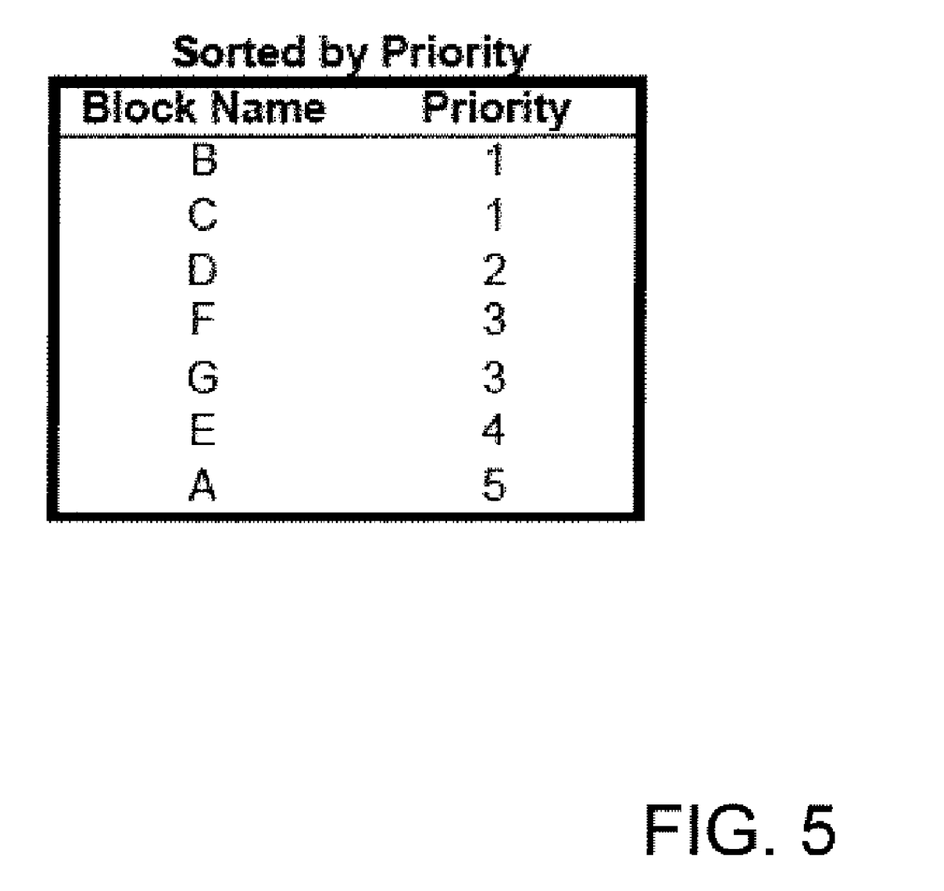
FIG. 5 shows an example of an ordered list of blocks in accordance with an embodiment of the present disclosure.
Figure 6:
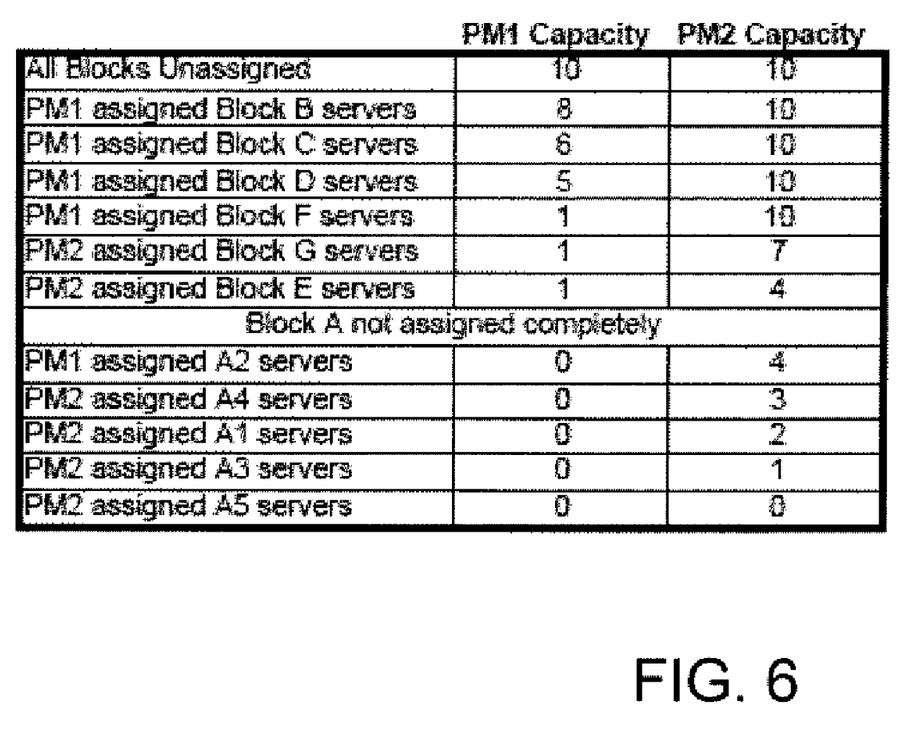
FIG. 6 shows an example of a controller ordering application service groups into policy managers in accordance with an embodiment of the present disclosure.

Turning now to FIGS. 4 through 6, an example application of the method for calculating configuration partitions is shown in accordance with an embodiment of the present disclosure. Example data is used in the hypothetical application, and it should be understood that the number of blocks, the number and priority of application service groups, and the assignment of service to policy managers is exemplary only to show one possible method of operation.

Referring to FIG. 4, seven exemplary blocks are shown, assigned letters "A" through "G." Block A may contain five application service groups, named "A1" through "A5." Application service group A1 may be assigned a priority of 6, application service group A2 may be assigned a priority of 5, application service group A3 may be assigned a priority of 6, application service group A4 may be assigned a priority of 5, and application service group A5 may be assigned a priority of 6. In the example hypothetical, a priority of 6 is the lowest priority, and a priority of 1 is the highest priority. Block A may be assigned the highest priority of all of the block A application service groups, so that block A may be assigned a priority of 5. Each application service group may require one server to operate, so that the number of servers that may be required by the block's application service groups may be five.

Block B may contain two application service groups, named "B1" through "B2." Application service group B1 may be assigned a priority of 5 and application service group B2 may be assigned a priority of 1. Block B may be assigned the highest priority of all of the block B application service groups, so that block B may be assigned a priority of 1. Each application service group may require one server to operate, so that the number of servers that may be required by the block's application service groups may be two.

Block C may contain two application service groups, named "C1" through "C2." Application service group C1 may be assigned a priority of 2 and application service group C2 may be assigned a priority of 1. Block C may be assigned the highest priority of all of the block C application service groups, so that block C may be assigned a priority of 1. Each application service group may require one server to operate, so that the number of servers that may be required by the block's application service groups may be two.

Block D may contain one application service group, named "D1." Application service group D1 may be assigned a priority of 2. Block D may be assigned the highest priority of all of the block D application service groups, so that block D may be assigned a priority of 2. Each application service group may require one server to operate, so that the number of servers that may be required by the block's application service groups may be one.

Block E may contain three application service groups, named "E1" through "E3." Application service group E1 may be assigned a priority of 5, application service group E2 may be assigned a priority of 4, and application service group E3 may be assigned a priority of 4. Block E may be assigned the highest priority of all of the block E application service groups, so that block E may be assigned a priority of 4. Each application service group may require one server to operate, so that the number of servers that may be required by the block's application service groups may be three.

Block F may contain four application service groups, named "F1" through "F4." Application service group F1 may be assigned a priority of 5, application service group F2 may be assigned a priority of 4, application service group F3 may be assigned a priority of 3, and application service group F4 may be assigned a priority of 4. Block F may be assigned the highest priority of all of the block F application service groups, so that block F may be assigned a priority of 3. Each application service group may require one server to operate, so that the number of servers that may be required by the block's application service groups may be four.

Block G may contain three application service groups, named "G1" through "G3." Application service group G1 may be assigned a priority of 3, application service group G2 may be assigned a priority of 4, and application service group G3 may be assigned a priority of 4. Block G may be assigned the highest priority of all of the block G application service groups, so that block G may be assigned a priority of 3. Each application service group may require one server to operate, so that the number of servers that may be required by the block's application service groups may be three.

As shown in FIG. 4, two policy managers are provided in the hypothetical example. The names of the policy mangers in the example are PM1 and PM2. Since the chunk size may be calculated by dividing the total number of servers on which application service groups are configured by the total number of available policy managers, the chunk size for the example is twenty total application service groups each with one server divided by two available policy managers, or ten.

Turning now to FIG. 5, the blocks from FIG. 4 may be sorted by block priority in accordance with an embodiment of the present disclosure. As shown in FIG. 5, the blocks may be sorted so that the highest priority blocks may appear first in the list, and the lowest priority blocks may appear last in the list. The blocks in FIG. 4 may be sorted so that block B is first, followed by blocks C, D, F, G, E, and A. Depending on the sorting algorithm used, blocks having the same priority may be sorted differently. For example, block C may be listed ahead of block B, as blocks C and B both have a priority of 1. Similarly, block G may be listed ahead of block F, as blocks G and F both have a priority of 3. In an alternate embodiment, blocks having the same priority may be sorted according to another characteristic.

Turning now to FIG. 6, the blocks from FIG. 4, sorted according to FIG. 5, may be assigned to a policy manager in accordance with an embodiment of the present disclosure. In a first iteration, all blocks may be unassigned, and both PM1 and PM2 may have a initial capacity based on the chunk size. In this example, both PM1 and PM2 may have a chunk size of 10. In other embodiments, one or more policy managers may have initial capacity values that are different.

The blocks may be assigned in the order as sorted according to FIG. 5. In the present example, the blocks may be sorted according to block priority, with the highest priority blocks near the beginning of the list, and the lowest priority blocks near the end of the list. In the first iteration, the application service groups associated with block B, B1 and B2, may be assigned to PM1. The available capacity associated with PM1 may be reduced to 8, reflecting the two servers associated with the application service groups included in block B. The available capacity associated with PM2 may remain at 10, since no blocks have been assigned to PM2 in this iteration. Block B may be removed from the list.

In a second iteration, the application service groups associated with block C, C1 and C2, may be assigned to PM1. The available capacity associated with PM1 may be reduced to 6, reflecting the two servers associated with the application service groups included in block C. Block C may be removed from the list.

In a third iteration, the application service groups associated with block D, D1, may be assigned to PM1. The available capacity associated with PM1 may be reduced to 5, reflecting the single server associated with the application service group included in block D. Block D may be removed from the list.

In a fourth iteration, the application service groups associated with block F, F1, F2, F3, and F4, may be assigned to PM1. The available capacity associated with PM1 may be reduced to 1, reflecting the four servers associated with the application service groups included in block F. Block F may be removed from the list.

In a fifth iteration, the controller may attempt to assign block G, with application service groups G1, G2, and G3, to PM1. However, this assignment of three servers associated with the application service groups, when PM1 is left with an available capacity of 1, may prompt the controller to search for another policy manager with sufficient capacity for the assignment of three application service groups. The controller may find PM2, with an available capacity of 10, and may assign the servers associated with the application service groups associated with block G to PM2. The available capacity associated with PM2 may be reduced to 7, reflecting the three servers associated with the application service groups included in block G. Block G may be removed from the list.

Similarly, in a sixth iteration, the application service groups associated with block E, E1, E2, and E3, may be assigned to PM2. The available capacity associated with PM2 is reduced to 4, reflecting the three servers associated with the application service groups included in block E. Block E may be removed from the list. If, for example, block E had one server associated with the application service group, then the controller may have assigned the server associated with the application service group in block E to PM1, which has a capacity of 1.

In a seventh iteration, the controller may attempt to assign block A, with associated application service groups A1, A2, A3, A4, and A5, to PM1. Noting that PM1 has an available capacity of 1, the controller may attempt to assign the servers associated with the application service groups in block A to PM2. Because neither PM1 nor PM2 may have sufficient capacity for the assignment of all of the servers associated with the application service groups associated with block A, the controller may "break" the block into component application service groups. That is, the controller may order the remaining application service groups in order of priority. In the current example, servers associated with the application service groups A2 and A4, both with priority 5, may be assigned before servers associated with the application service groups A1, A3, and A5, with priority 6. The controller may assign each of the servers associated with the application service groups to an available policy manager based on priority. The controller may the server associated with the assign application service group A2 to PM1 in a seventh iteration, and the available capacity associated with PM1 may be reduced to zero, reflecting the assignment of the server associated with application service group A2. The controller may continue to attempt to assign application service groups to PM1, or may remove PM1 from the list of available policy managers, since the available capacity has been reached. The controller may then assign A4, A1, A3, and A5 to PM2 in eighth, ninth, tenth, and eleventh iterations, respectively, reducing the available capacity in PM2 by one after each assignment. After all of the application service groups formerly associated with block A are assigned, both PM1 and PM2 may have an available capacity of zero, and no more blocks or application service groups may remain in the list to be assigned.

At this point it should be noted that configuration partitioning in accordance with the present disclosure as described above typically involves the processing of input data and the generation of output data to some extent. This input data processing and output data generation may be implemented in hardware or software. For example, specific electronic components may be employed in a computer processor or similar or related circuitry for implementing the functions associated with configuration partitioning in accordance with the present disclosure as described above. Alternatively, one or more processors operating in accordance with stored instructions may implement the functions associated with configuration partitioning in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for configuration partitioning comprising:
a module for providing one or more policy managers;
a module for providing one or more applications, wherein the one or more applications are assigned to one or more application groups;
a module for assigning the one or more application groups to one or more blocks, wherein more than one of the one or more application groups are assigned to a common one of the one or more blocks based at least in part on whether the more than one of the one or more application groups are related; and
a module for assigning each of the one or more blocks to one or more of the one or more policy managers;
wherein if a block cannot be assigned to a policy manager, breaking the block into the one or more application groups that were assigned to the block and assigning the one or more application groups that were assigned to the block to one of the one or more policy managers.

2. The system of claim 1, wherein the one or more application groups are associated with a priority.

3. The system of claim 1, wherein the one or more blocks are associated with a priority.

4. The system of claim 3, wherein the priority of the one or more blocks is determined by the highest priority of the associated one or more application groups.

5. The system of claim 1, further comprising a module for sorting the blocks based on priority.

6. The system of claim 1, wherein the more than one of the one or more application groups are related if the more than one of the one or more application groups are dependent upon one another.

7. A method for configuration partitioning comprising the steps of:
providing one or more policy managers;
providing one or more applications, wherein the one or more applications are assigned to one or more application groups;
assigning the one or more application groups to one or more blocks, wherein more than one of the one or more application groups are assigned to a common one of the one or more blocks based at least in part on whether the more than one of the one or more application groups are related; and
assigning each of the one or more blocks to one or more of the one or more policy managers;
wherein if a block cannot be assigned to a policy manager, breaking the block into the one or more application groups that were assigned to the block and assigning the one or more application groups that were assigned to the block to one of the one or more policy managers.

8. The method of claim 7, wherein the one or more application groups are associated with a priority.

9. The method of claim 7, wherein the one or more blocks are associated with a priority.

10. The method of claim 9, wherein the priority of the one or more blocks is determined by the highest priority of the associated one or more application groups.

11. The method of claim 7, further comprising sorting the blocks based on priority.

12. At least one non-transitory processor readable storage medium for storing a computer program of instructions configured to be readable by at least one processor for instructing the at least one processor to execute a computer process for performing the method as recited in claim 7.

13. The method of claim 7, wherein the more than one of the one or more application groups are related if the more than one of the one or more application groups are dependent upon one another.

14. An article of manufacture for configuration partitioning, the article of manufacture comprising:
at least one non-transitory processor readable storage medium; and
instructions carried on the at least one storage medium;
wherein the instructions are configured to be readable from the at least one storage medium by at least one processor and thereby cause the at least one processor to operate so as to:
provide one or more policy managers;
provide one or more applications, wherein the one or more applications are assigned to one or more application groups;
assign the one or more application groups to one or more blocks, wherein more than one of the one or more application groups are assigned to a common one of the one or more blocks based at least in part on whether the more than one of the one or more application groups are related; and
assign each of the one or more blocks to one or more of the one or more policy managers;
wherein if a block cannot be assigned to a policy manager, breaking the block into the one or more application groups that were assigned to the block and assigning the one or more application groups that were assigned to the block to one of the one or more policy managers.

15. The article of claim 14, wherein the one or more application groups are associated with a priority.

16. The article of claim 14, wherein the one or more blocks are associated with a priority.

17. The article of claim 16, wherein the priority of the one or more blocks is determined by the highest priority of the associated one or more application groups.

18. The article of claim 14, wherein the at least one processor is further caused to operate so as to:
sort the blocks based on priority.

19. The article of claim 14, wherein the more than one of the one or more application groups are related if the more than one of the one or more application groups are dependent upon one another.

* * * * *